(12) United States Patent
Yoshida

(10) Patent No.: US 7,051,289 B1
(45) Date of Patent: May 23, 2006

(54) WINDOW DISPLAY DEVICE AND METHOD, AND A RECORDING MEDIUM RECORDING A WINDOW DISPLAY CONTROL PROGRAM

(75) Inventor: Akira Yoshida, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 1060 days.

(21) Appl. No.: 09/040,539

(22) Filed: Mar. 17, 1998

(30) Foreign Application Priority Data

Mar. 21, 1997 (JP) .................................. 9-068537

(51) Int. Cl.
G09G 5/00 (2006.01)

(52) U.S. Cl. ...................... 715/784; 715/527; 715/785; 715/786; 715/792; 715/806; 715/856

(58) Field of Classification Search ................ 345/341, 345/346, 123, 973; 707/526, 527, 525; 715/784, 715/785, 786, 792, 806, 856, 157, 527
See application file for complete search history.

(56) References Cited

U.S. PATENT DOCUMENTS

| | | | | |
|---|---|---|---|---|
| 5,263,134 A | * | 11/1993 | Paal et al. ................... | 345/341 |
| 5,337,405 A | * | 8/1994 | Lindauer et al. ............ | 345/147 |
| 5,379,375 A | * | 1/1995 | Dao et al. .................... | 345/155 |
| 5,463,726 A | * | 10/1995 | Price .......................... | 345/340 |
| 5,548,702 A | * | 8/1996 | Li et al. ...................... | 345/155 |
| 5,745,098 A | * | 4/1998 | Yamaji ........................ | 345/341 |
| 5,860,074 A | * | 1/1999 | Rowe et al. ................. | 707/526 |
| 5,867,678 A | * | 2/1999 | Amro et al. ................. | 345/341 |
| 5,930,809 A | * | 7/1999 | Middlebrook ............... | 707/501 |
| 5,943,679 A | * | 8/1999 | Niles et al. .................. | 707/526 |
| 5,945,998 A | * | 8/1999 | Eick ............................ | 345/431 |
| 6,054,990 A | * | 4/2000 | Tran ............................ | 345/358 |

FOREIGN PATENT DOCUMENTS

| | | |
|---|---|---|
| JP | 4-28786 | 1/1992 |
| JP | PUPA07-21403 | 7/1993 |
| JP | 6-168276 | 6/1994 |
| JP | 6-259211 | 9/1994 |

OTHER PUBLICATIONS

Docu Plus V1.0, Operation Manual, pp. 1-5, Jan. 29, 1997, IBM Japan.

* cited by examiner

Primary Examiner—Ba Huynh
(74) Attorney, Agent, or Firm—John H. Holcombe

(57) ABSTRACT

The disclosed invention allows the user to move to an area to which the user desires to display in a page to which the user desires to move by a single manipulation and to allow next page/preceding page operation to be done only by a mouse operation. An area displayed on the main screen 50 is displayed on the sub-screen 51 of a reduced image of the page which is currently displayed on the main screen 50 with a rectangular view frame 60. Dragging the view frame 60 by a mouse within the page causes the display area in the main screen to move in real time. Dragging the view frame of the sub-screen 51 to a neighboring page causes the view frame 60 to be moved in the moved sub-screen. Dropping the view frame at the place on the neighboring sub-screen to which the view frame 60 moved causes the main screen to be switched to that page to display the place indicated by the view frame in the main screen. Simultaneously, the sub-screen is scrolled so that the sub-screen of the page displayed in the main screen comes to the center of the sub-screen column.

8 Claims, 5 Drawing Sheets

[Figure 1]
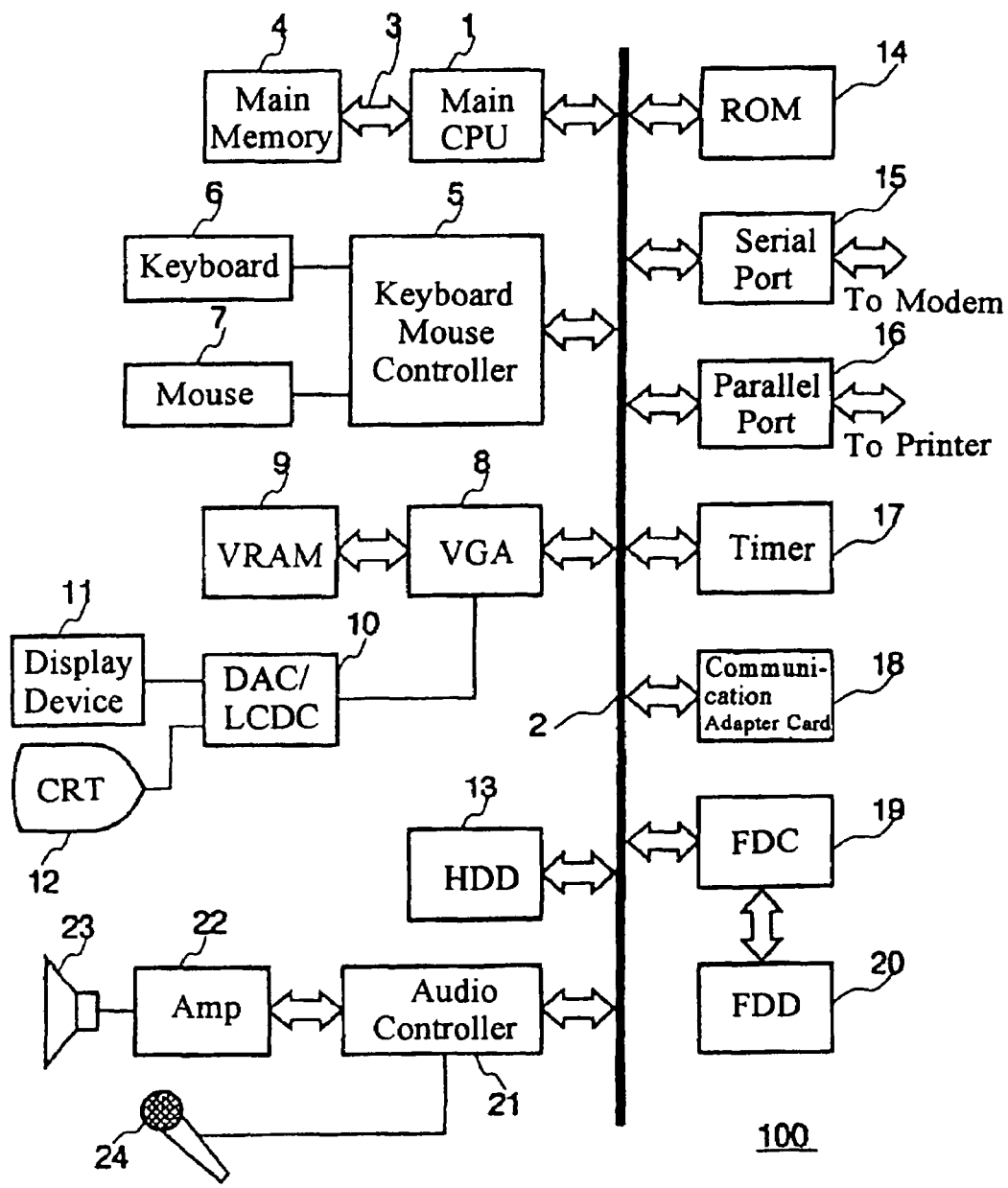

[Figure 2]
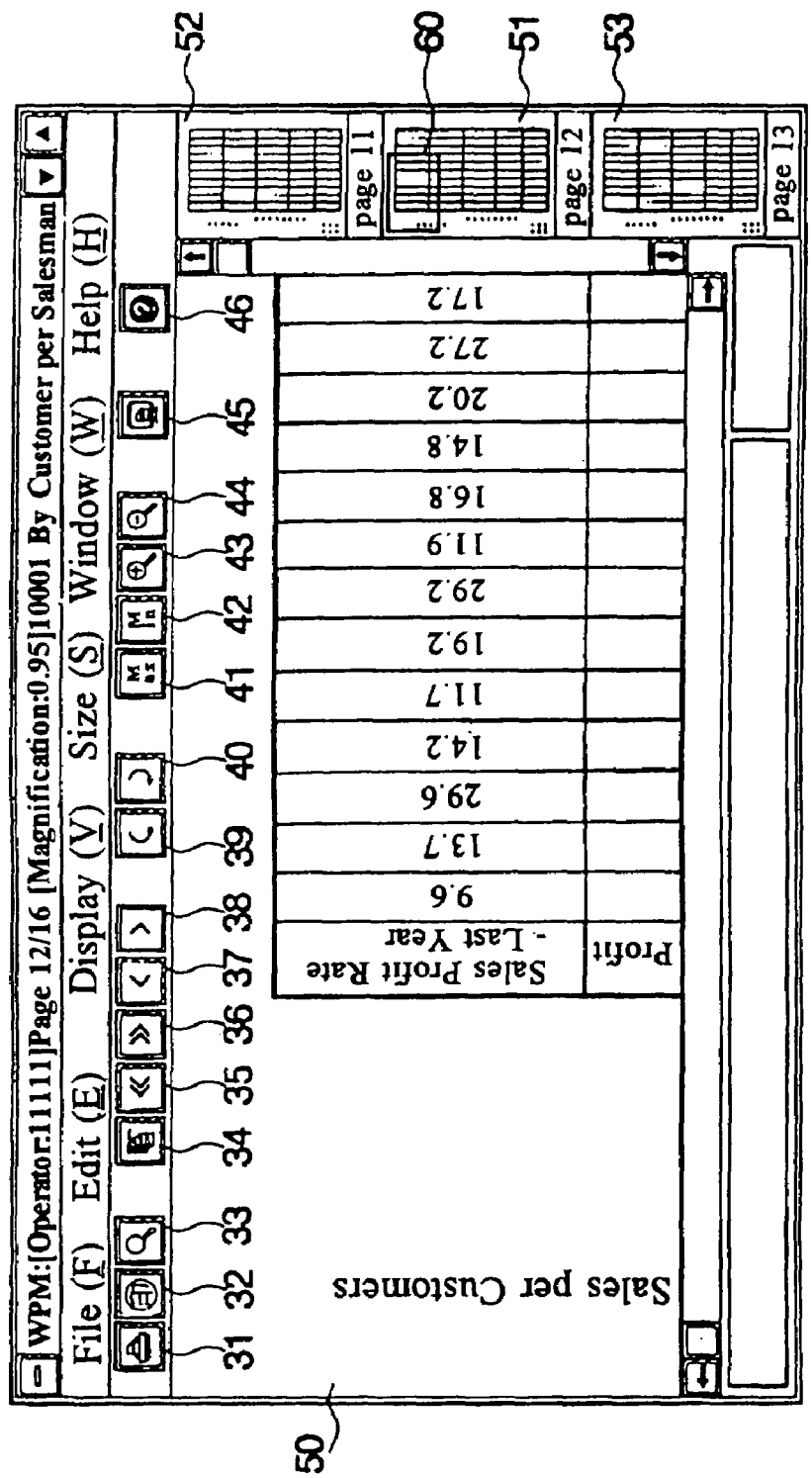

[Figure 3]
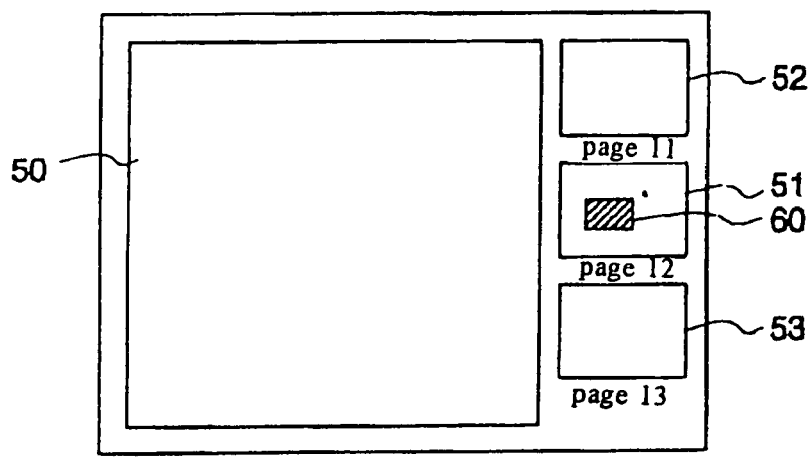
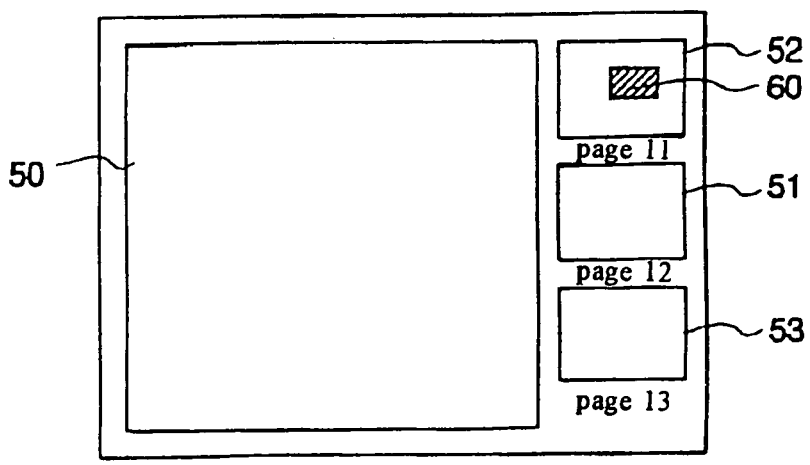
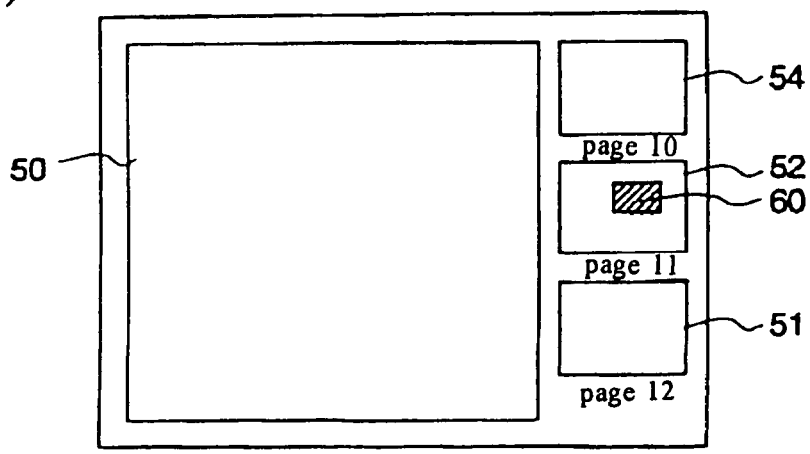

[Figure 4]
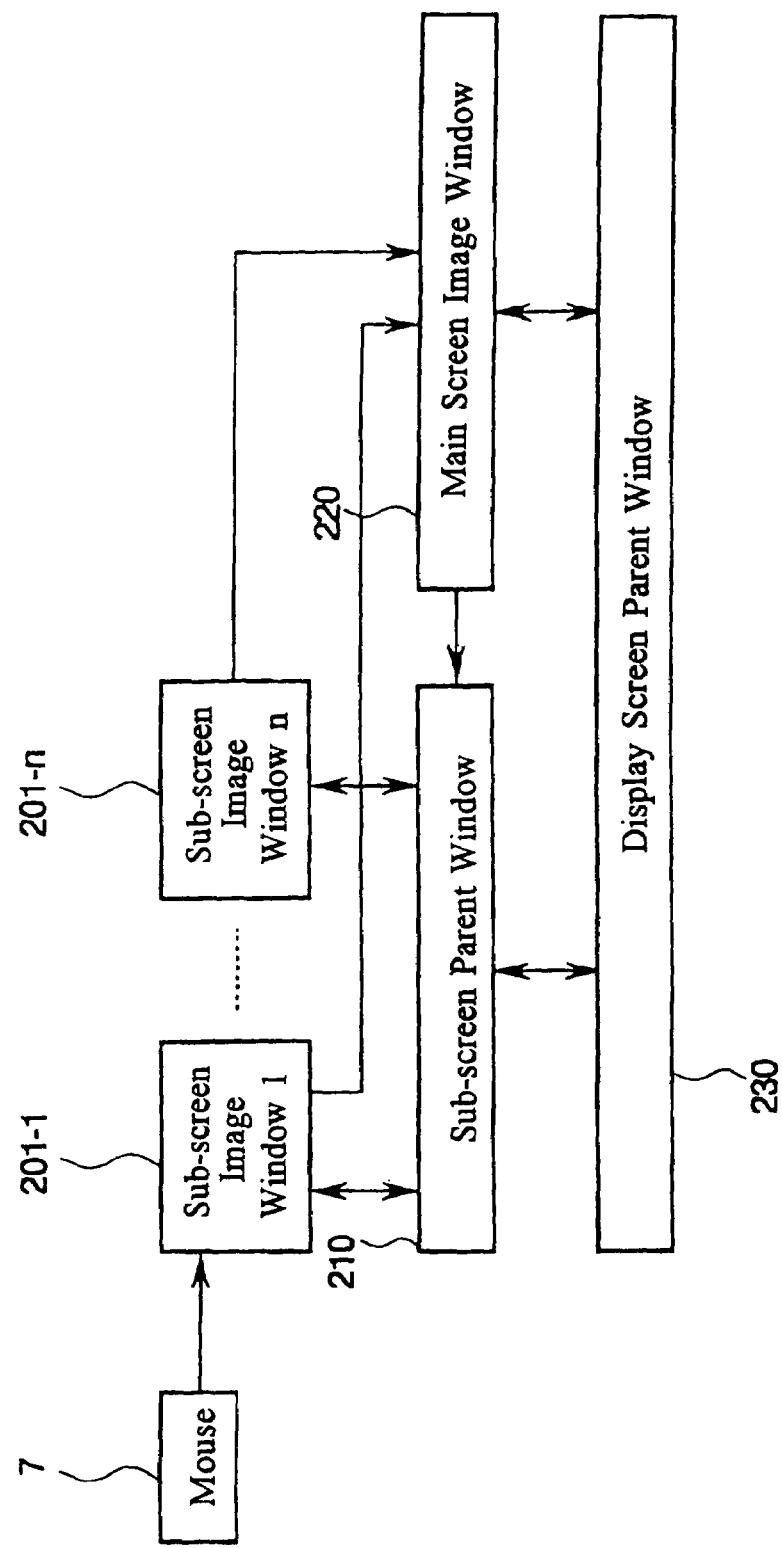

[Figure 5]
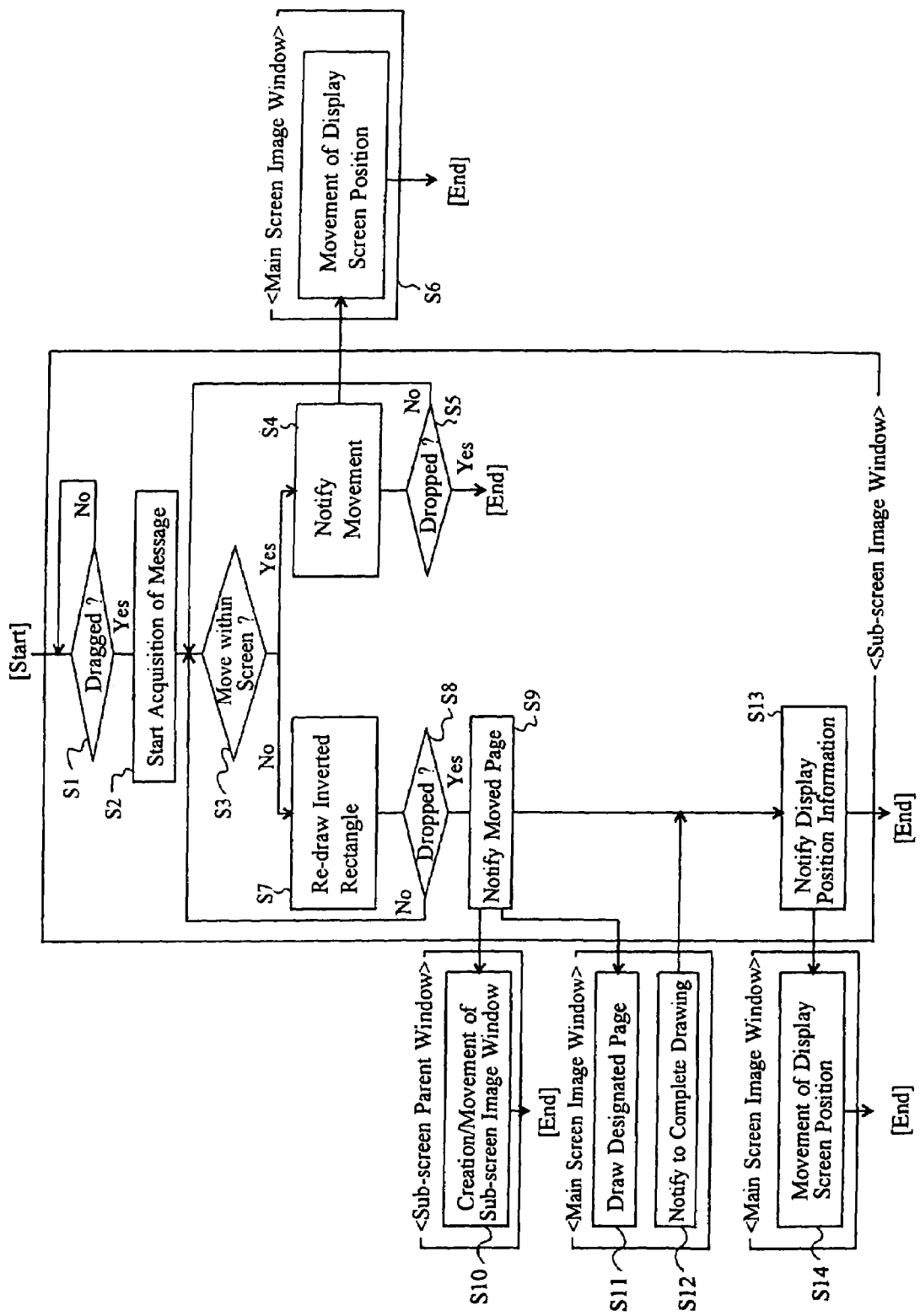

WINDOW DISPLAY DEVICE AND METHOD, AND A RECORDING MEDIUM RECORDING A WINDOW DISPLAY CONTROL PROGRAM

TECHNICAL FIELD

This invention relates to a page scrolling technique for scrolling reduced images of page displayed in a window on a display screen of a display device and, in particular, to a window display device, a method of displaying a window and a recording medium recording a window display control program for displaying an enlarged main screen displaying a part of a page, a sub screen displaying the entire image of that page in a reduced form and pages preceding and following that page in a reduced form.

BACKGROUND OF THE INVENTION

There has been proposed, in a data processing system such as a workstation and a personal computer, an electronic filing system (PUPA 6-168276) or an image database system (PUPA 4-28786) for recording, saving and re-utilizing document image data. Also, an interactive processing system (PUPA 6-259211) has been disclosed in which a plurality of interface parts (menu and the like) for executing user interface function on the display screen of a display device are disposed in a manipulation screen panel of one window.

Further, among contributions to expansion of man-machine interface function of such information systems, a window display method has been provided ("DocuPlus V1.0 Operation Guide", -1-j, pp. 1–5, Jan. 29, 1997, IBM Japan) in which; in displaying image data having a page delimiter on a display screen, images of all pages are displayed in a reduced form in the window together with a main screen which displays a part of pages with enlargement, and mouse clicking on a reduced screen of a page (called thumb nail) to be moved causes the main screen to be replaced with that page. With this window display method, the user can visually confirm the page to be moved, easily select the page of the desired screen simply by mouse manipulation and immediately confirm the detail of the content in the enlarged screen so that searching information is expedited with ease.

In the above described window display method, however, it is necessary to adjust the display position of the main screen after the page has been switched because the area displayed in the main screen is not shown in the reduced screen in switching the screen which is to be displayed with enlargement. In addition, when the reduced screen to be displayed with enlargement lies at the edge of the screen, adjustment of display position of the main screen has to be done at the edge of the window screen. Further, when a preceding or a next page which does not appear on the display screen is to be manipulated, the user has to command scrolling each time it is manipulated.

SUMMARY OF THE INVENTION

In view of the above, it is an object of this invention to provide a window display device, a method of displaying window and a recording medium recording a window display control program which allows the page which the user wants to move to be moved to a desired area by a single manipulation.

It is another object of this invention to allow the customarily used operation on preceding/next page to be done simply by manipulation of a pointing device without using a key.

To achieve the above objectives, one aspect of this invention comprises, a window display device which displays image data on a display screen a first sub-screen displaying a first area of image data, a main screen displaying a part of the first area with enlargement, a second sub-screen displaying a second area which is adjacent to the first area, a first sub-screen image window for displaying an area displayed in the main screen with a display indicating frame on the first sub-screen, a main screen image window for moving the display indicating frame and the display area within the main screen in correspondence to an output representing movement of a pointing device as notified by the first sub-screen window, the first sub-screen window causing the display indicating frame to be moved within the first sub-screen while the pointing device is in dragging state and, a second sub-screen image window for displaying the display indicating frame in the second sub-screen when the pointing device has moved the display indicating frame by dragging it into the second sub-screen.

Another aspect of this invention comprises, a window display device which displays image data having a page delimiter on a display screen a main screen displaying a part of a page with enlargement, a first sub-screen displaying the image of that page in a sub-screen column, a second sub-screen displaying one or more second areas which is adjacent to the page, a first sub-screen image window for displaying a reduced image of a page which is currently displayed on the main screen with the area displayed in the main screen indicated by a display indicating frame, a main screen image window for moving the display indicating frame and the display area within the main screen in correspondence to an output representing movement of a pointing device as notified by the first sub-screen window, the first sub-screen window causing the display indicating frame to be moved within the same page while the pointing device is in dragging state, a second sub-screen image window for displaying the display indicating frame in the second sub-screen when the pointing device has moved the display indicating frame by dragging it into the second sub-screen, a display screen parent window operative when the pointing device has dropped the display indicating frame at an arbitrary place on the second screen to which the pointing device moved, for switching the main screen to the page to which the pointing device moved and displaying the place indicated by the display indicating frame in the main screen and a sub-screen parent window for scrolling the sub-screen so that the sub-screen of the page displayed on the main screen comes to a predetermined position of the sub-screen column.

In the above, the sub-screen parent window scrolls the sub-screen so that the sub-screen of the page displayed on the main screen comes to substantially the central position of the sub-screen column.

Another aspect of this invention comprises a window display method of displaying image data on a display screen of a display device having a first sub-screen displaying a first area of image data, a main screen displaying a part of the first area with enlargement and a second sub-screen displaying a second area which is adjacent to the first area, the method comprising the steps of; displaying an area displayed in the main screen with a display indicating frame on the first sub-screen, moving the display indicating frame and the display area within the main screen in correspondence to the movement of a pointing device which causes the display indicating frame to be moved within the first sub-screen while the pointing device is in dragging state and, displaying the display indicating frame in the second sub-screen when the pointing device has moved the display indicating frame by dragging it into the second sub-screen.

Another aspect of this invention comprises a window display method of displaying image data having a page delimiter on a display screen of a display device having a main screen displaying a part of a page with enlargement, a first sub-screen displaying the image of that page and a second sub-screen displaying one or more second areas which is adjacent to the page, the method comprising the steps of; displaying a reduced image of a page which is currently displayed on the main screen with the area displayed in the main screen indicated by a display indicating frame, moving the display indicating frame and the display area within the main screen in correspondence to the movement of a pointing device which causes the display indicating frame to be moved within the same page while the pointing device is in dragging state, displaying the display indicating frame in the second sub-screen when the pointing device has moved the display indicating frame by dragging it into the second sub-screen, switching the main screen to the page to which the pointing device moved to display the place indicated by the display indicating frame in the main screen when the pointing device has dropped the display indicating frame at an arbitrary place on the second screen to which the pointing device moved to display the place indicated by the display indicating frame in the main screen, and scrolling the sub-screen so that the sub-screen of the page displayed on the main screen comes to a predetermined position of the sub-screen column.

Another aspect of this invention relates to a recording medium recording a display control program for displaying image data on a display screen of a display device, the display control program causing a computer to: display a first sub-screen displaying a first area of image data, display a main screen displaying a part of the first area with enlargement, display a second sub-screen displaying a second area which is adjacent to the first area display the area displayed in the main screen on the first sub-screen with a display indicating frame, move the display indicating frame and the display area within the main screen in correspondence to the movement of a pointing device which causes the display indicating frame to be moved within the first sub-screen while the pointing device is in dragging state and, display the display indicating frame in the second sub-screen when the pointing device has moved the display indicating frame by dragging it into the second sub-screen.

Another aspect of this invention relates to a recording medium recording a display control program for displaying image data having a page delimiter on a display screen of a display device, the display control program causing a computer to: including a main screen displaying a part of a page with enlargement, a first sub-screen displaying the image of that page and a second sub-screen displaying one or more second areas which is adjacent to the page display a reduced image of a page which is currently displayed on the main screen with the area displayed in the main screen indicated by a display indicating frame, move the display indicating frame and the display area within the main screen in correspondence to the movement of a pointing device which causes the display indicating frame to be moved within the same page while the pointing device is in dragging state, display the display indicating frame in the second sub-screen when the pointing device has moved the display indicating frame by dragging it into the second sub-screen, switching the main screen to the page to which the pointing device moved to display the place indicated by the display indicating frame in the main screen, when the pointing device has dropped the display indicating frame at an arbitrary place on the second screen to which the pointing device moved and, scroll the sub-screen so that the sub-screen of the page displayed on the main screen comes to a predetermined position of the sub-screen column.

For a fuller understanding of the present invention, reference should be made to the following detailed description taken in conjunction with the accompanying drawings.

BRIEF DESCRIPTION OF THE DRAWINGS

FIG. 1 is a block diagram of a hardware configuration of a data processing system to which this invention is preferably applied.

FIG. 2 is a plan view of a detailed example of the display screen implementing the visual page scrolling function of this invention.

FIGS. 3A–C is a schematic diagram showing the steps of operation of this invention.

FIG. 4 is a block diagram showing a program structure of the window implementing the visual page scrolling function of this invention.

FIG. 5 is a flow chart showing an example of control operation of the window of FIG. 4.

DETAILED DESCRIPTION OF THE INVENTION

Embodiments of the invention will now be described with reference to the drawings herewith.

Hardware Embodiment

FIG. 1 shows an example of a hardware configuration of a data processing system to which this invention is preferably applied. The data processing system 100 may be implemented by a conventional workstation and a personal computer and comprises a main CPU (central processing unit) 1 such as a microprocessor which controls arithmetic operation of the entire system and a main memory 4 which is used for working area of the CPU. The CPU 1 and the main memory 4 are connected to other components including a hard disk device 13 as an auxiliary storage, a ROM 14 for storing a constant, a serial port 15 for a modem, a parallel port 16 for a printer, a timer 17 and a communication adapter 18 through a bus 2.

A floppy disk device 20 which drives a floppy disk such as MO and CD-ROM is connected to the bus 2 through a floppy disk controller 19. A computer program code as shown in FIG. 5 which gives instructions to the CPU and the like in cooperation with an operating system to practice this invention is recorded in the floppy disk, the hard disk device 13 and the ROM 14 and executed by being loaded in the memory 4.

Further, as a user interface hardware, there are a pointing device 7 such as a mouse and a joystick, a keyboard 6 and a display (image display device) 12 as shown in FIG. 2 for displaying an image. The mouse 7 and the keyboard 6 are connected to the bus 2 via a keyboard mouse controller 5. A display device 11 such as the display 12 and a display lump are connected to the bus 2 via a display drive control device 10 having a digital-analog converter and a video graphic array 8 to which is also connected a video RAM 9. A speaker 23 receives an audio signal which is digital-analog converted by an audio controller 21 via an amplifier 22 for output as a voice. The audio information from a microphone 24 is taken in the system after it is analog-digital converted by the audio controller 21. It should be understood that these components are shown as an example and all of them are not necessarily indispensable components of this invention. For instance, the microphone 24 may be removed and instead an image reading device or a character recognition device may be connected if needed.

While an operating system which supports as a standard a GUI (graphic user interface) multi-window environment such as Windows (trademark of Microsoft), OS/2 (trademark of IBM) and X-WINDOW system (trademark of MIT) on AIX (trademark of IBM) is preferable, those supporting a character base environment such as PC-DOS (trademark of IBM) and MS-DOS (trademark of Microsoft) may be workable because the GUI environment may be provided in the application side and the operating system is not limited to any specific operating system environment.

Embodiment of Display Screen

FIG. 2 shows a detailed example of a display screen implementing a visual page scrolling function of this invention. In this figure, 50 is a main screen (main window screen) displaying a part of a page with enlargement in displaying image data which has a page delimiter in the display 12 in FIG. 1. 51 is a sub-screen (page view sub-window screen) displaying the image of the entire page which is currently displayed on the main screen 50. 52 is a sub-screen displaying the page preceding to the page currently displayed on the main screen 50 while 53 is a sub-screen displaying the page next to the page currently displayed on the main screen 50.

These sub-screens 52, 51, 53 are so laid out that they are disposed vertically in sequence at the right edge of the display screen with the sub-screen 51 of the page displayed on the main screen 50 being at the center of the sequence. In other word, in page movement, the sub-screen is scrolled so that the reduced screen of the moved page comes to the display position of 51.

While one preceding page and one next pages of the central sub-screen 51 are displayed in the example shown in FIG. 2, more pages may be displayed. For example, when the display area of the main screen 50 is relatively small, all pages (e.g., more than 10 pages) may be displayed at one time. Further, when the image continues horizontally and vertically as in the case of a map, a two dimensional array is possible.

The area currently displayed in the main screen 50 is displayed with a rectangle (hereinafter called a view frame) 60 on the sub-screen 51 of the page which is displayed on the main screen 50 in order to indicate in which part of the entire page it is. The rectangle of the view frame 60 is either uniformly painted with a predetermined light color or displayed in inverted color so as to make the extent of display of the current main screen immediately recognizable on the sub-screen 51. Incidentally, this view frame 60 may be called either one of a display indicating frame, a document display area, an inverted area and a display position rectangle.

Examples of various tool bar buttons 31–46 are displayed in the upper part of the main screen 50. Depression of a page designating button 34 in the tool bar causes a jump to the designated page, depression of a start page button 35 causes the first page to be displayed, depression of a last page button 36 causes the last page to be displayed, depression of a preceding page button causes the preceding page to be displayed and depression of a next page button causes the next page to be displayed.

With respect to the main screen 50, depression of counterclockwise rotation button 39 in the tool bar causes the display screen to be rotated counterclockwise, depression of clockwise rotation button 40 causes the display screen to be rotated clockwise, depression of maximize button 41 causes the screen displayed to be maximized, depression of minimize button 42 causes the screen displayed to be minimized, depression of enlarge button 43 causes the screen displayed to be enlarged and depression of reduce button 44 causes the screen displayed to be reduced.

The sub-screen 51–53 may be selectively displayed or not displayed as required. By selecting window view in the menu or depressing the page view button 45 in the tool bar, display/non display is alternated. In addition, the number of sub-screens of display (e.g., 7 at maximum) may be variably set.

In addition, there are a help button 46 displaying a help screen, a print button 31 for printing a ledger, a check stamp menu button 32 displaying check stamp menu and, a search button 33 for searching through the ledger. Further, information relating to the display of the main screen 50 is displayed in letters above the buttons 31–46 of the tool bar. However, these buttons and messages are for exemplary purpose and all of them are not necessarily indispensable components. A screen structure of different layout may be used.

Mode of Operation

Next, an example of operation of this invention is now described with reference to FIG. 3. Incidentally, this figure is schematically depicted by eliminating various buttons and document displays of FIG. 2 to simplify the illustration.

As shown in FIG. 3(A), the area displayed in the main screen is displayed by a rectangular view frame 60 on the sub-screen 51 of the page (page 12 in this figure) currently displayed on the main screen 50. The view frame 60 is shown, for example, as an inverted area by inverted display. By dragging the view frame (with the left button of the mouse held depressed within the view frame 60) in the central sub-screen 51 through the same page, the display area in the main screen 50 also moves in real time.

Next, by dragging the view frame 60 to the neighboring page, e.g., the preceding page (page 11 in this figure), the view frame 60 moves into the sub-screen 52 to which the view frame 60 moved.

By dropping (releasing the left button of the mouse) at a place on the sub-screen 51 to which the view frame is dragged and where it is desired to display, the main screen 50 switches to that page (page 11) at the timing of dropping as shown in FIG. 3(C) to display the place indicated by the rectangular view frame 60 in the main screen 50. Simultaneously, the sub-screen is scrolled so that the sub-screen of the page displayed in the main screen 50 comes to the center of the sub-screen column.

By repeating the above operation, consecutive preceding pages (or following pages) are displayed one after another on the main screen and thus the sub-screen is scrolled so that this provides the visual page scrolling function in lieu of the next page/preceding page key or the next page/preceding page button 37, 38.

While movement to the preceding page is shown in FIG. 3, the same visual page scrolling as the above described one is performed by the same operation as the above for movement to the next page.

Display Control Method

FIG. 4 shows a program structure of the window for implementing the visual page scrolling function of this invention described in FIG. 3 and the flow chart of FIG. 5 shows an example of the control procedure therefor.

The window implementing this invention (window procedure) comprises n sub-screen image windows 201 corresponding to the number of sub-screens n, sub-screen parent window 210, main screen image window 220 and display screen parent window 230 as shown in FIG. 4 and information is exchanged as shown by the arrow heads in FIG. 4.

The sub-screen image window 201 provides movement and re-drawing of the view frame 60 according to dragging and dropping of the mouse and the movement of the mouse. The sub-screen parent window 210 provides creation and movement (scroll) of the sub-screen image window 201 corresponding to the moved page which is notified from the sub-screen image window 201.

The main screen image window 220 provides; movement of the display screen position of the main screen 50 corresponding to the movement of the mouse which is notified from the sub-screen image window 201, drawing of the page designated corresponding to the moved page which is notified from the sub-screen image window 201 and, movement of the display screen position of the main screen 50 corresponding to the display position information which is then notified from the sub-screen image window 201.

Next, the control operation in the embodiment of this invention is now described in detail with reference to the flow chart of FIG. 5. In the figure, S represents a step.

First of all, when the sub-screen image window 201 of the sub-screen 51 of the page currently displayed on the main screen 50 detects that the view frame 60 (inverted area) has been dragged by the mouse (S1), acquisition of WM-MOUSEMOVE message (signal) of the mouse 7, that is so called mouse-capture is started (S2).

When the sub-screen image window 201 detects that the view frame 60 has moved within the sub-screen 51 (S3) based on the output of the mouse (WM-MOUSEMOVE), it causes the view frame 60 on the sub-screen 51 to move corresponding to the movement of the mouse and notifies the movement to the main screen image window 220 (S4). When the view frame 60 is dropped, the process is terminated as it is while the process returns to the determination at S3 when it is not dropped (S5).

The main screen image window 220 provides movement of display screen position of the main screen 50 corresponding to the movement of the mouse which is notified from the sub-screen image window 201 (S6). Thus, by dragging the view frame 60 in the central sub-screen 51 within the same page, the display area within the main screen also moves in real time.

On the other hand, when the sub-screen image window 201 determines based on the output of the mouse that it moves out of the sub-screen 51 into the sub-screen of another page (S3), it re-draws an inverted rectangle of the view frame 60 in the moved sub-screen (S7). The sub-screen image window 201 then determines whether or not the mouse is dropped (S8) and the process returns to the determination step S3 if not dropped while the moved page is notified to the sub-screen parent window 210 and the main screen image window 220 substantially simultaneously (S9) if dropped.

When the sub-screen parent window 210 is notified of the moved page from the sub-screen image window 201, it provides creation and movement (scroll) of the sub-screen image window 201 so that the sub-screen of the designated page is displayed at the center.

When the main screen image window 220 receives a notification of the moved page from the sub-screen image window 201, it provides a reference drawing of the designated page for the main screen 50 (S11) and notifies sub-screen image window 201 of completion of drawing when drawing is completed (S12). When the sub-screen image window 201 receives the notification of completion of drawing, it notifies the main screen image window 220 of the display position information of the view frame 60 (S13). When the main screen image window receives the notification of the display position information, it moves the display screen position of the main screen 50 corresponding to the notified display position information (S14).

Because the sub-screen image window 201 is processed in parallel with the main screen image window 220, dragging the view frame to a neighboring page causes the main screen 50 to be switched to that page at the time the view frame is dropped and the place indicated by the view frame 60 is displayed in the main screen while the sub-screen is scrolled so that the sub-screen of the page displayed in the main screen comes to the center of the sub-screen column.

Although omitted in the flow chart of FIG. 5, when the page designation button 34 of FIG. 2 is depressed in the tool bar, the page jumps to the designated page which is displayed in the main screen 50 and the sub-screen 51 of that page is displayed in the center of the sub-screen column. However, when the page jumps to the first page by the page designation button 34 or the start page button 35 of FIG. 2 is depressed, the sub-screen 52 of the first page is displayed on top of the sub-screen column in displaying the first page in the main screen 50. Similarly, when the page jumps to the last page or the last page button 36 of FIG. 2 is depressed, the sub-screen 53 of the last page is displayed at the tail of the sub-screen column in displaying the last page in the main screen 50.

While a mouse was shown as an input means in the above embodiment of this invention, the input means may include other pointing devices (coordinate indicator) such as a track pad, a track ball, a digitized, a tablet and a joystick without being limited to a mouse.

While display of image data having a page delimiter was shown in the above embodiment, this invention is not limited to such image data. By providing a sub-screen into which a part of entire drawing is reduced, a simple movement to a place to which movement is desired is also possible for image data such as a map which is not delimited by page.

Further, the embodiment of this invention includes a recording medium which stored therein a control program represented by a software implementing this invention.

Effect of Invention

As described in the above, the following effects are obtained according to this invention.

(1) The user can move to an area where it is desired to display in the page to which it is desired to move at one manipulation because the user can instantly see which place is displayed with enlargement when switching screens by seeing the movement display of the view frame (display indication frame).

(2) Because the sub-screen is scrolled so that the sub-screen of the switched screen is displayed substantially at the center of the sub-screen column in switching screens, next page/preceding page operation which is frequently used in practice can be simply done only by manipulating a pointing device without using a key. Therefore, movement of user's eye and hand is minimized thereby contributing to faster and easier operation as well as user friendliness.

(3) By displaying a plurality of sub-screens into which image of an entire page is reduced and scrolling the sub-screen so that the sub-screen of the switched screen is displayed substantially in the center of the sub-screen column in switching screens, the user can easily and quickly confirm visually the page which it is desired to move for moving the page.

While the preferred embodiments of the present invention have been illustrated in detail, it should be apparent that modifications and adaptations to those embodiments may occur to one skilled in the art without departing from the scope of the present invention as set forth in the following claims.

DESCRIPTION OF REFERENCE NUMBERS

1: Main CPU
2: Bus
4: Main Memory
5: Keyboard Mouse Controller
7: Mouse
12: Display
14: ROM
50: Main Screen
51, 52, 53: Sub-screen
60: View Frame (display indicating frame)
201: Sub-screen Image Window
210: Sub-screen Parent Window
220: Main Screen Image Window
230: Display Screen Parent Window

I claim:

1. A window display device which displays image data on a display screen, comprising:
   a first sub-screen displaying a first area of image data;
   a main screen displaying a part of said first area of image data with enlargement;
   a second sub-screen displaying a second area of image data which is adjacent to said first area of image data;
   a first sub-screen image window for displaying an area of image data displayed in said main screen with a display indicating frame on said first sub-screen;
   said display indicating frame being moved within said first sub-screen, said movement being caused by movement of a pointing device while said pointing device is in a dragging state, said movement of said display indicating frame being effected due to the sub-screen window;
   said first sub-screen window notifying a main screen image window of said movement of said pointing device;
   said main screen image window receiving said notification from said first sub-screen window;
   said main screen image window moving said image data within said main screen in correspondence to the received notification; and
   a second sub-screen image window for displaying said display indicating frame in said second sub-screen when said pointing device has moved said display indicating frame by dragging it into said second sub-screen.

2. A window display device which displays image data having a page delimiter on a display screen, comprising:
   a first sub-screen displaying a first area of image data in a sub-screen column;
   a main screen displaying a part of said first area of image data with enlargement;
   a second sub-screen displaying in said sub-screen column a second area of image data which is adjacent to said first area of image data;
   a first sub-screen image window for displaying a reduced image of a page which is currently displayed on said main screen with said first area of image data displayed in said main screen indicated in said first sub-screen image window by a display indicating frame;
   a main screen image window for moving said display indicating frame and said image data within said main screen in correspondence to an output representing movement of a pointing device as notified by said first sub-screen window, said first sub-screen window causing said display indicating frame to be moved within the same page while said pointing device is in dragging state;
   a second sub-screen image window for displaying said display indicating frame in said second sub-screen when said pointing device has moved said display indicating frame by dragging it into said second sub-screen;
   a display screen parent window operative when said pointing device has dropped said display indicating frame at an arbitrary place on said second sub-screen to which said pointing device moved, for switching said main screen to the page to which said pointing device moved and displaying the place indicated by said display indicating frame in said main screen; and
   a sub-screen parent window for scrolling said sub-screen so that the sub-screen of the page displayed on said main screen comes to a predetermined position of said sub-screen column.

3. The window display device of claim 2 in which said sub-screen parent window scrolls said sub-screen so that the sub-screen of the page displayed on said main screen comes to substantially the central position of said sub-screen column.

4. A window display method of displaying image data on a display screen of a display device having a first sub-screen displaying a first area of image data, a main screen displaying a part of said first area of image data with enlargement and a second sub-screen displaying a second area of image data which is adjacent to said first area of image data, said window display method comprising the steps of:
   displaying an area displayed in said main screen with a display indicating frame on said first sub-screen;
   notifying a main screen window of movement of a pointing device;
   moving said display indicating frame and the image data within said main screen in correspondence to said movement of said pointing device which causes said display indicating frame to be moved within said first sub-screen while said pointing device is in dragging state; and
   displaying said display indicating frame in said second sub-screen when said pointing device has moved said display indicating frame by dragging it into said second sub-screen.

5. A window display method of displaying image data having a page delimiter on a display screen of a display device having a main screen displaying a part of a page with enlargement, a first sub-screen displaying a first area of image data of that page in a sub-screen column and a second sub-screen displaying one or more second areas of image data which is adjacent to said page, said window display method comprising the steps of:
   displaying a reduced image of a page which is currently displayed on said main screen with the image data displayed in said main screen indicated by a display indicating frame;

moving said display indicating frame and said image data within said main screen in correspondence to the movement of a pointing device which causes said display indicating frame to be moved within the same page while said pointing device is in dragging state;

displaying said display indicating frame in said second sub-screen when said pointing device has moved said display indicating frame by dragging it into said second sub-screen;

switching said main screen to the page to which said pointing device moved to display the place indicated by said display indicating frame in said main screen when said pointing device has dropped said display indicating frame at an arbitrary place on said second sub-screen to which the pointing device moved to display the place indicated by said display indicating frame in said main screen; and scrolling said sub-screen so that the sub-screen of the page displayed on said main sub-screen comes to a predetermined position of said sub-screen column.

6. A recording medium recording a display control program for operating a computer system having a display device for displaying image data on a display screen of said display device, said display control program causing said computer system to:

display a first sub-screen displaying a first area of image data;

display a main screen displaying a part of said first area of image data with enlargement;

display a second sub-screen displaying a second area of image data which is adjacent to said first area of image data;

display the part of said first area of image data displayed in said main screen on said first sub-screen with a display indicating frame;

notify a main screen window of movement of a pointing device;

move said display indicating frame and said image data within said main screen in correspondence to said movement of said pointing device which causes said display indicating frame to be moved within said first sub-screen while said pointing device is in dragging state; and display said display indicating frame in said second sub-screen when said pointing device has moved said display indicating frame by dragging it into said second sub-screen.

7. A recording medium recording a display control program for operating a computer system having a display device for image data having a page delimiter on a display screen of a display device, said display control program causing said computer system to:

display a main screen displaying a part of a page with enlargement:

display first sub-screen displaying a first area of image of that page in a sub-screen column;

display a second sub-screen displaying one or more second areas of image data which is adjacent to said page in said sub-screen column;

display a reduced image of a page which is currently displayed on said main screen with the image data displayed in said main screen indicated by a display indicating frame;

move said display indicating frame and said image data within said main screen in correspondence to the movement of a pointing device which causes said display indicating frame to be moved within the same page while said pointing device is in dragging state;

display said display indicating frame in said second sub-screen when said pointing device has moved said display indicating frame by dragging it into said second sub-screen;

switching said main screen to the page to which said pointing device moved to display the place indicated by said display indicating frame in said main screen, when said pointing device has dropped said display indicating frame at an arbitrary place on said second sub-screen to which said pointing device moved; and scroll said sub-screen so that the sub-screen of the page displayed on said main sub-screen comes to a predetermined position of said sub-screen column.

8. A window display device according to claim 1, wherein said display indicating frame has a width and a height, said width being less than a width of said first sub-screen and said height being less than a height of said first sub-screen.

* * * * *